July 10, 1928.
T. A. BEANEY
1,676,883
MACHINE FOR CUTTING OFF AND PREPARING STOCK STRIPS
Filed July 2, 1924     5 Sheets-Sheet 1
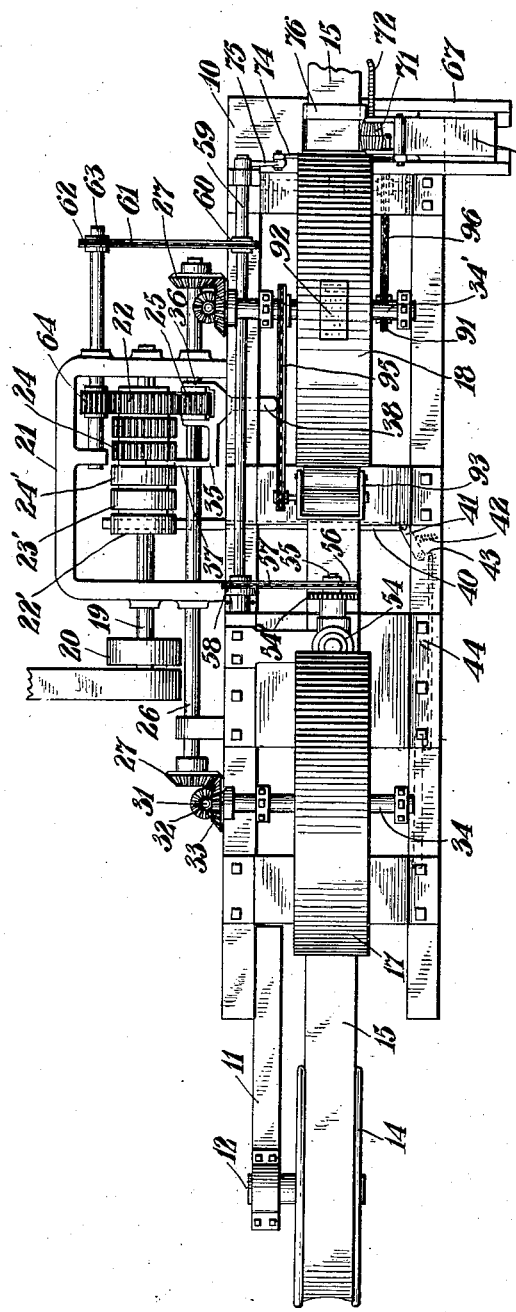
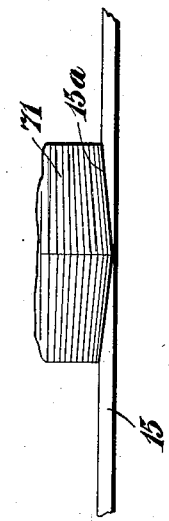
INVENTOR,
Thomas A. Beaney.
BY
Ramsay Hoguet,
ATTORNEY

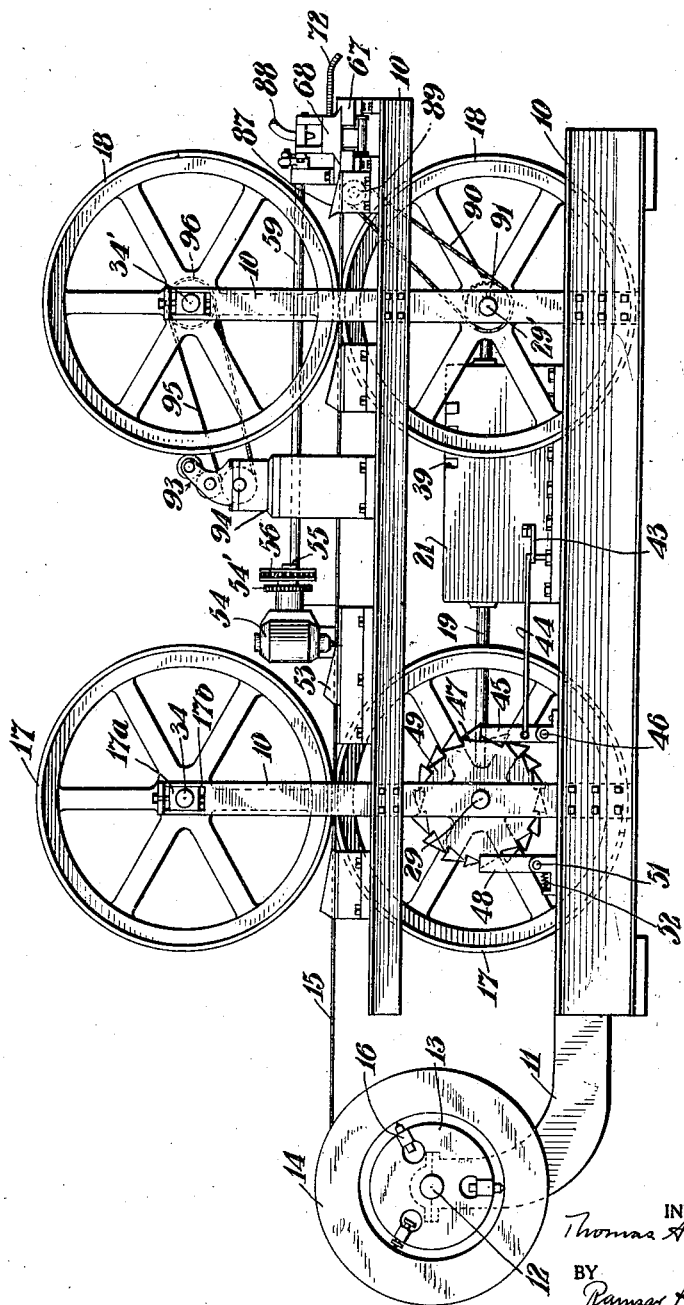

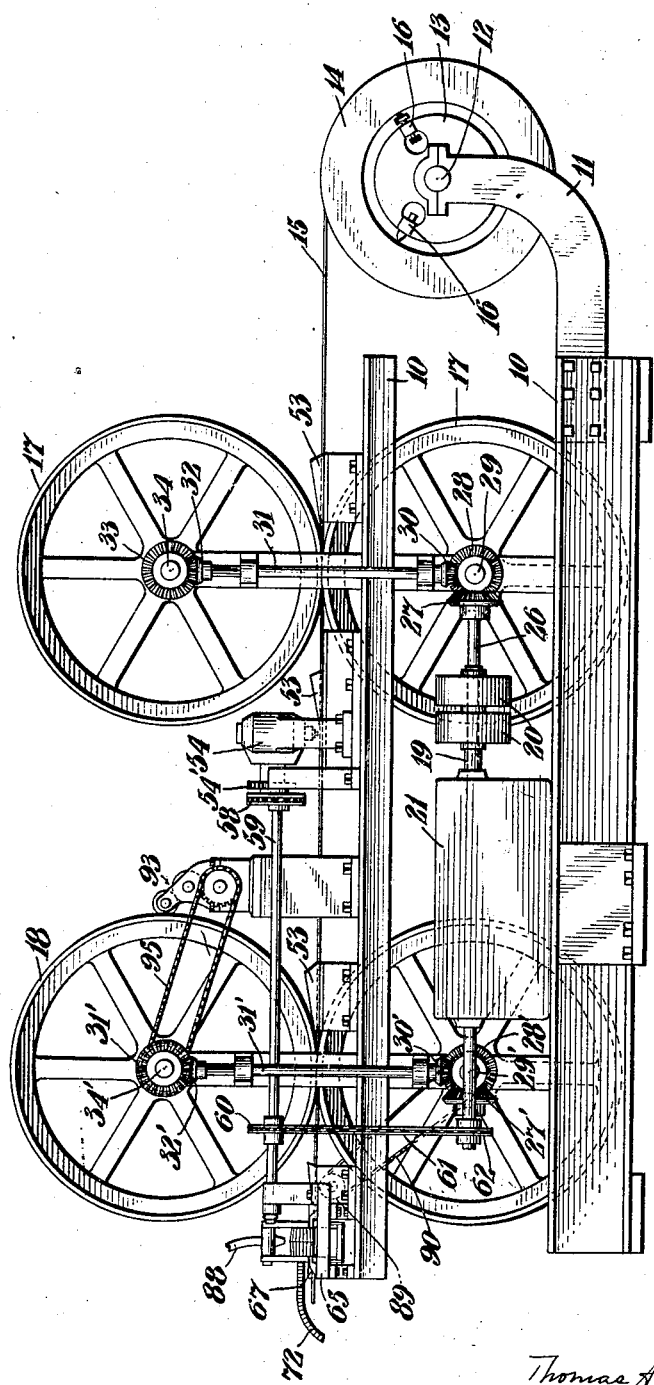

July 10, 1928.
T. A. BEANEY
1,676,883
MACHINE FOR CUTTING OFF AND PREPARING STOCK STRIPS
Filed July 2, 1924    5 Sheets-Sheet 4
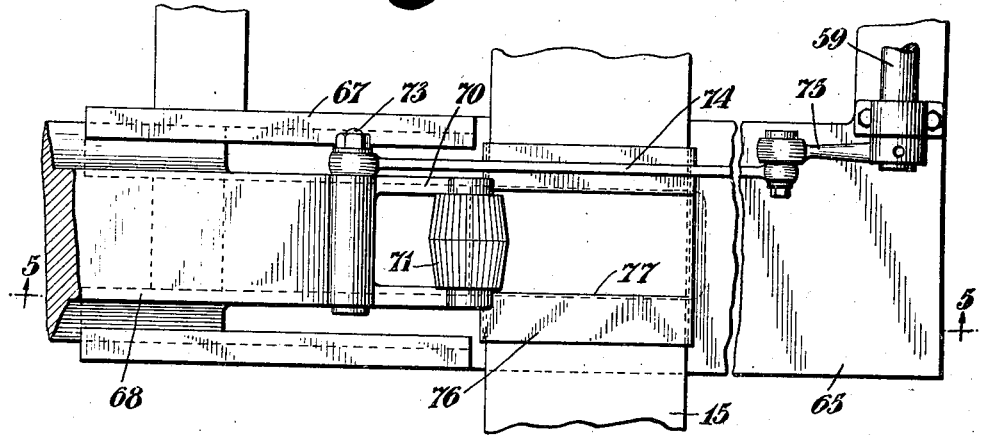
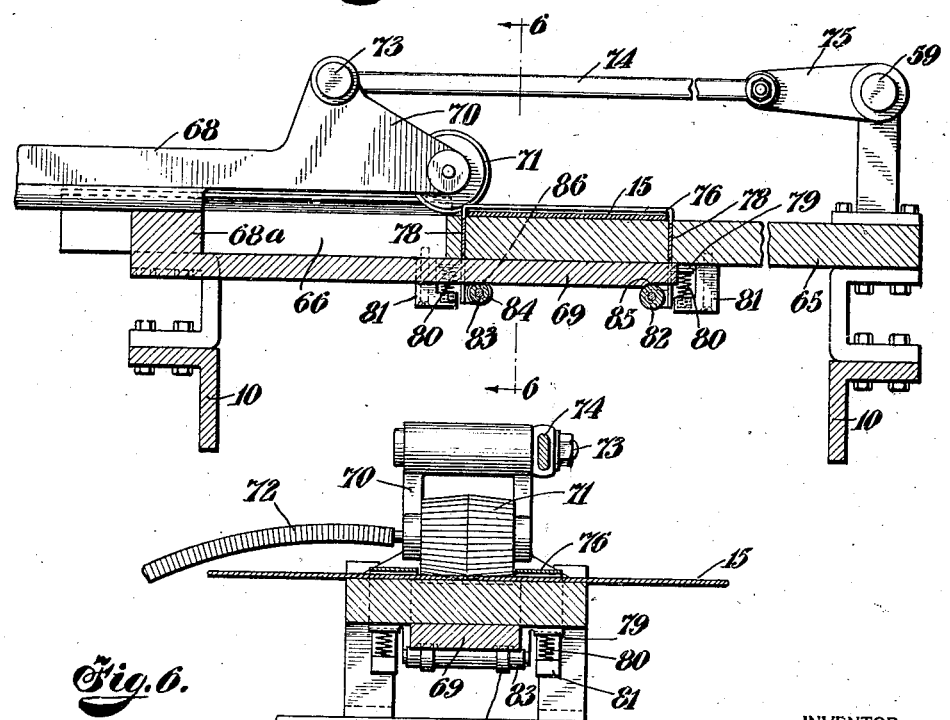
INVENTOR,
Thomas A. Beaney.
BY
Ramsay Hoguet,
ATTORNEY July 10, 1928.

T. A. BEANEY 1,676,883

MACHINE FOR CUTTING OFF AND PREPARING STOCK STRIPS

Filed July 2, 1924    5 Sheets-Sheet 5

INVENTOR,
Thomas A. Beaney.
BY
Ramsay Hoyner
ATTORNEY

Patented July 10, 1928.

1,676,883

UNITED STATES PATENT OFFICE.

THOMAS A. BEANEY, OF POUGHKEEPSIE, NEW YORK, ASSIGNOR TO BEANEY RUBBER COMPANY INC., OF NEW YORK, N. Y., A CORPORATION OF NEW YORK.

MACHINE FOR CUTTING OFF AND PREPARING STOCK STRIPS.

Application filed July 2, 1924. Serial No. 723,612.

My invention relates to improvements in machines adapted to cut off long lengths of stock into desired lengths, and at the same time perform operations on the severed parts which will prepare them for use. Specifically my invention is used for preparing tire flaps such as are used between the inner tube and the outer tire, and the invention cuts a long strip of stock into desired lengths, skives or thins the severed parts at both sides of the point of severance thus preparing two end portions of flaps at once, punches the valve hole in the flap, and if desired prints upon the flap directions for its use. The machine is intended to do this work advantageously and rapidly, and from the description which follows it will be seen that while the machine as illustrated is particularly adapted for the preparation of tire flaps, it might be used for many other purposes where a stock strip is severed and treated in a manner analogous to that illustrated.

In order that the work may be carried on accurately and without loss of material, I provide an intermittent feed, and arrange the operating parts so that when the feed stops, the stock will be cut off, and the severed strip or flap cut, skived and punched, and if desired printed. Another object of my invention is to produce a machine of this character having means as stated for cutting off and preparing the stock, together with a lock which will lock the stock feed against movement in either direction, while other work is being done, and further to provide means for adjusting the feed to produce flaps or stock strips of different lengths, and likewise have the adjusting means operate in relation to the locking means so that the locking and adjusting means will both be simultaneously placed to properly co-operate. My invention is intended further to produce a means for holding the stock firmly while it is being cut and skived or thinned, and yet in a manner which will be convenient to permit the proper feeding of the main strip. These and other advantages will appear from the description which follows.

Reference is to be had to the accompanying drawings forming a part of this specification, in which similar reference characters indicate corresponding parts in all the views.

Figure 1 is a plan view of the machine showing my improvements.

Figure 2 is a front elevation thereof.

Figure 3 is a rear elevation of the machine.

Figure 4 is an enlarged detail plan of the cut-off mechanism showing the cutter in the act of engaging the stock.

Figure 5 is an enlarged cross sectional elevation on the line 5—5 of Figure 4.

Figure 6 is a cross section on the line 6—6 of Figure 5.

Figure 9 is a detail of one of the mutilated gears of the adjustable drive, and

Figure 10 is an enlarged diagrammatic view illustrating the manner in which the stock is cut off into flaps or strips.

Figure 7:
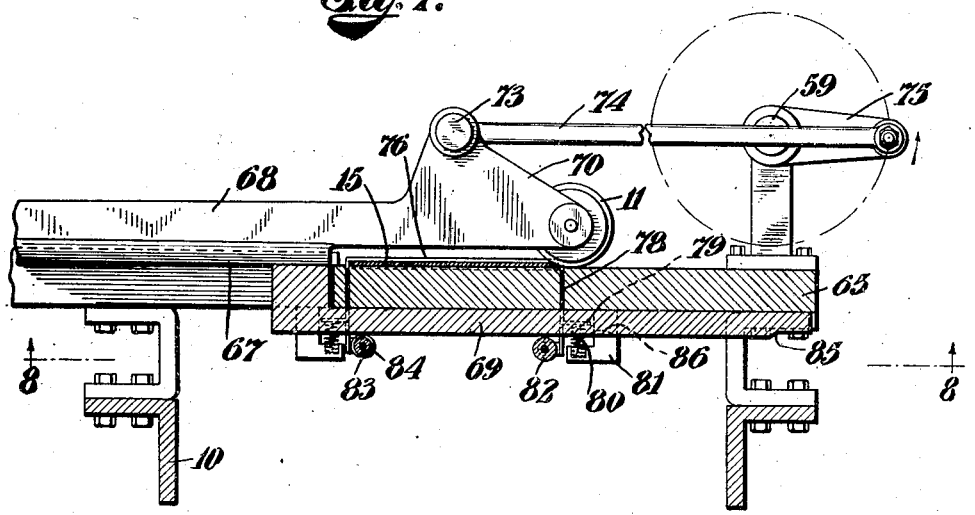
Figure 7 is a view similar to Figure 5 but showing the cutter in the act of leaving the stock.

The machine is provided with a suitable frame 10 which can be of any design capable of carrying the operating parts, and at one end has preferably a bracket 11 at the upper end of which is journaled a stud 12 carrying the roller 13 on which is placed the drum 14 which carries the long stock strip 15 from which the flaps are prepared. For the particular use referred to, rubberized cloth or canvas is generally used, and it comes on drums like the drum 14, and the roller 13 is adjusted with relation to the drum so as to hold the drum correctly by means of the bolt attachments 16 which are carried by the roller and engage the inner wall of the drum. Obviously any usual or suitable means can be used for adjusting and tightening the drum on the roller, and likewise the drum might be supported independently from the machine, or the long stock strips might be fed to the machine in any suitable way without affecting the invention.

The stock in strip form is carried through the machine by the pairs of feed wheels 17 and 18 which are spaced apart horizontally and arranged one above the other vertically in a manner customary with feed wheels, and they have a uniform drive, but the wheels 18 are preferably slightly larger than the wheels 17 so as to hold the stock under tension while it is being printed on and punched, as hereinafter described. This is necessary because the stock is usually convex on one side and concave on the other, and in any event it has a tendency to curl and cannot be well operated on unless it is held taut and flat.

The upper and lower feed wheels are preferably movable with relation to each other to provide for varying thicknesses of stock, and they are preferably driven from a common driving shaft to the end that they may be easily and accurately timed and simultaneously adjusted in their movements. This driving mechanism is shown in Figures 1, 2 and 3, and a convenient means of driving is shown, but without the intention of limiting the invention to this particular drive, though it is believed to be novel. The drive shaft 19 is driven by means of tight and loose pulleys 20 or other equivalent driving gear, and it enters the gear box 21 and has a plurality of mutilated driving gears 22, 23 and 24, although a greater or less number may be used. These gears have each teeth on one side and a plain surface on the other as shown in Figure 9, and the number of teeth varies to provide for driving the feed wheels a distance proportional to the flaps or stock strips to be cut off, as will presently appear. The gear 22 is shown connecting with a pinion 25 on the countershaft 26 (see Figure 1) and this drives both pairs of feed wheels, the connection to the feed wheels 17 being by means of a bevel pinion 27, the bevel pinion 28 on the lower feed wheel shaft 29, the pinion 30, the vertical shaft 31, the pinion 32, and the pinion 33 on the upper shaft 34. This shaft is mounted in a box $17^a$ which slides on and is keyed to the shaft 31 and moves in a slot $17^b$ at the upper end of its support. The connection with the feed wheels 18 is exactly similar to that just described, and the corresponding parts are marked $27^1$, $28^1$, etc.

Thus it will be seen that both sets of feed wheels comprising the stock feed are similarly driven and must have the same movement. The pinion 25 is keyed to the shaft 26 and by moving it into connection with the desired drive gear 22, 23 or 24, which have different numbers of teeth, it will be seen that a greater or less movement will be given to the feed wheels or rolls, the desired movement depending on the length of strip which is to be cut from the main stock strip. To effect this movement a suitable shipper 35 is used, having a fork 36 to engage the pinion 25, and having an arm 37 to move the cams $22^1$, $23^1$ and $24^1$, which correspond to the gears 22, 23 and 24, and which are keyed to the shaft 19 as shown in Figure 1. Thus when the gear 25 is moved into engagement with a desired mutilated drive, the corresponding cam will be similarly moved so as to engage its actuated mechanism which locks the feed wheels as presently described. It will be noticed by reference to Figure 9 that the feed wheels are at rest during half the rotation of one of the gears 22, 23 or 24, and during this idle moment of the feed the wheels are locked and the cutting and punching takes place. The shipper 35 has a suitable handle 38 which when turned down engages one of the notches 39 on the edge of the gear box 21 (see Figure 2) and holds the shipper and connected parts in place.

The rotating cams $22^1$, etc., actuate the lever 40 (see Figure 1) which in turn acts on a link 41 against the tension of a spring 42, and the link connects by means of a bell crank 43 (see Figures 1 and 2) with a rod 44 which is pivoted to the pawl 45, this in turn being pivoted to a suitable support 46 and arranged to engage the notches 47 on a locking wheel 49 attached to the shaft $29^1$. On the opposite side of the locking wheel is a pawl 48 acting as a detent, this being pivoted as shown at 51 and held against the wheel 49 by a spring 52. There are preferably as many teeth 47 on the wheel 49 as there are teeth on the driving pinion 25, so that whenever the feed wheels stop, the pawls 45 and 48 will engage in their respective notches and lock the wheels against forward movement by momentum or backwards. I have shown this locking arrangement connected to one of the feed wheels, but in practice I prefer to connect it with both sets of feed wheels so as to distribute the strain, and the connection could be like that indicated, or other locking means might be used.

As the stock 15 is fed through the machine, it passes through suitable guiding devices 53 and is punched at appropriate distances by the punch 54 which is not shown in detail but which can be any approved type of punch having an adjusting device $54^1$ and being arranged to punch a hole through the strip so that a valve stem or the like can be inserted and no subsequent punching will be required. The punch can be actuated during the interval that the feed is at rest, and can be driven in any suitable manner. As shown it has a stud 55 driven by a sprocket wheel 56, and this connects by a chain 57 with a sprocket wheel 58 on the shaft 59 which is suitably mounted on the machine frame parallel with the shaft 63 from which it is driven, the connection being by means of the sprocket wheel 60, chain belt 61, and sprocket wheel 62. It will be seen that when the teeth of one of the mutilated gears 22, 23, etc., engage the pinion 25 to drive the feed wheels, the plain face of the said gear will be opposite the pinion 64, and so the punch will not be operated; but when the plain face of the gear is opposite the pinion 25, the teeth will engage the pinion 64 and operate the punch.

Figure 8:
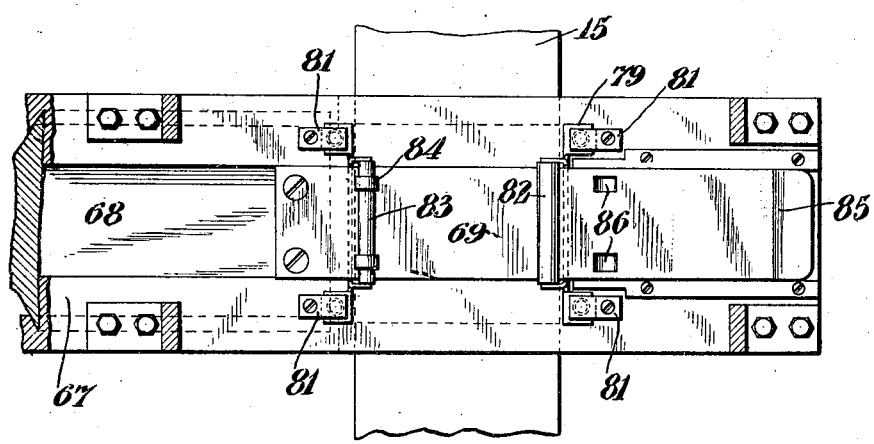
Figure 8 is a view on the line 8—8 of Figure 7, looking up.

After leaving the feed wheels 18, the stock strip 15 passes over a bed 65 which is supported on the main frame and which is slotted as shown at 66 in Figure 5, and is provided with a transverse slideway 67 in which a slide 68 moves transversely, this slide having a part 68ª moving in the slot 66 and having on the under side an extension 69 as shown in Figures 5, 7 and 8. The slide 68 has at one end a fork 70, between the arms of which is pivoted a cutter 71 which is a rapidly rotating buzz cutter of any suitable type, largest in the center and tapering towards the ends as shown clearly in Figures 4 and 6, and it may be driven in any suitable manner, as for instance by the flexible shaft 72. It will be seen by reference to Figure 10 that when this buzz cutter is forced transversely across the stock 15, it will sever the stock and will also skive or thin the adjacent end portions of the stock near the line of severance, as shown at 15ª. Thus as the main stock strip is severed two end parts of two stock strips or flaps are simultaneously and nicely skived. The cut off device by means of which the stock is severed is moved backward and forward transversely of the stock by means of a pitman 74 which connects a stud 73 on the slide 68 with the crank 75 on the shaft 59 herein referred to, so that the same shaft simultaneously moves the cut-off device backward and forward across the stock and actuates the punch 54.

As previously remarked, the stock while being punched is held under tension by reason of the difference in diameter of the wheels 17 and 18, but at the point where it is cut off it has passed the last pair of feed wheels 18, and therefore a separate tension device is necessary. To this end I provide a presser foot 76 having a slight vertical movement which will hold the stock automatically very flat and tight so that it can be smoothly cut. This presser foot has an opening in the top as shown at 77 for the passage of the buzz cutter 71, and it has opposite side portions turned down as shown at 78 and extended through the bed 65, these parts 78 having abutments 79 thereon which are normally pressed up by springs 80 supported in hangers 81 on the under side of the bed, and which raise the presser foot so that the stock 15 can pass smoothly beneath it during the forward feed of the stock. The presser foot is pulled down, however, at the time the stock is cut off by means of rollers 82 and 83 carried by the downwardly extended parts 78 (see Figure 5). When the slide 68 is moved to carry the buzz cutter 71 across the stock, the extension 69 engages the rollers 82 and 83 and pulls down the presser foot so as to hold it firmly upon the stock. When, however, the cutter is retracted and the stock is to be fed forward, the springs 80 lift the presser foot and the roller 82 rests in the groove 85 of the extension 69, while the enlarged parts 84 of the roller 83 enter the recess 86 (see Figure 8) of the extension 69, thus permitting the upward movement of the presser foot.

A blow pipe 88 is arranged just above the cut off device (see Figure 2) so as to blow away the dust, but obviously this might be a suction pipe as well. A feed roll 89 acting against a suitable abutment 87 is also used to carry forward the stock 15 after it has left the feed wheels 18. This feed roller 89 can be operated in any convenient way, as for instance by a chain belt 90 connecting with a sprocket wheel 91 on the shaft 29¹ (see Figure 2).

It is desirable to print on the formed flaps or stock strips, and to this end one of the feed wheels, as for instance the feed wheel 18, is provided with type 92 which can represent the directions for using the flap, the name of the maker, or other matter, and in connection with this is an ordinary inking arrangement comprising the inking rolls 93 mounted on a suitable support 94 and driven by a chain belt 95 connecting with the sprocket wheel 96 on the shaft 34¹. Obviously any suitable printing mechanism or inking mechanism can be substituted for that shown.

When the machine is to be used, the stock 15 which is usually on a drum 14, is threaded through the guiding device 53, and we will assume that it is advanced to the position where the end has been cut off by the buzz cutter 71. At this moment the cutter will be in the position shown in Figure 5, the presser foot 76 will be raised as shown in the same figure to permit the passage of the stock 15 through it, and the gear 22 or similar gear will be in engagement with the pinion 25, so that the first action is to turn the feed wheels 17 and 18 through the connection with the shaft 26. While this driving connection with the feed wheels remains they will advance the stock a distance corresponding to the length of a flap to be made. At this moment the gear 22 will have ceased to engage the pinion 25, but will engage the pinion 64, and so turn the shaft 59. This actuates the punch 54 to punch a hole through the stock, and will also through the instrumentality of the crank 75 and pitman 34 move the slide 68 forward and back, this action cutting off the stock and shaping both ends of adjacent flaps or strips as already described, and the operation is repeated automatically. It will be noted that when the stock is advanced the printing will be effected, and the printing attachment may or may not be used as desired.

From the foregoing description it will be noted that it is only necessary to enter the long strip of stock in the machine, and that thereafter the work is automatic until the strip is used up, the parts being tensioned, printed upon, punched, and cut off ready for use. It will also be noted that the punch 54 might so far as the operation of the machine is concerned, be any other instrument adapted to stamp or do other work upon the stock.

I claim:—

1. A machine of the kind described comprising an intermittent stock feed arranged to feed lengthwise a stock strip of a length to make a plurality of articles to be formed, means for regulating the extent of each feeding movement, and a cut-off device reciprocating transversely across the stock and acting when the feed rests to sever the stock and skive the parts near the line of severance.

2. A machine of the kind described comprising an intermittent stock feed arranged to feed lengthwise a stock strip of a length to make a plurality of articles to be cut, means for locking the feed at the end of each feed movement, and a cut-off device moving transversely of the stock as the feed rests and acting to sever the stock and skive the parts near the line of severance.

3. A machine of the kind described comprising an intermittent stock feed arranged to feed lengthwise a strip of stock of a length to form a plurality of articles, means for locking the feed at the end of each feeding movement, means for regulating the extent of the feeding movement and timing the locking means to conform to such regulation, and means for skiving the stock cross-wise thereof as the feed rests.

4. A machine of the kind described comprising an intermittent stock feed to feed a stock strip lengthwise, means for regulating the feed to determine the length of severed strips, and means for automatically punching and cutting off the stock and skiving the parts of the stock near the line of severance.

5. A machine of the kind described comprising an intermittent stock feed to feed a stock strip lengthwise, means for regulating the length of feed movements, and automatic means for printing, punching and cutting off the stock into lengths and simultaneously skiving the severed parts near the point of severance.

6. A machine of the kind described comprising an intermittent stock feed to feed the stock lengthwise through the machine, an automatic lock to intermittently lock the feed against movement, and a transversely moving cut-off acting when the stock feed is at rest and shaped to sever the stock and skive the adjacent parts.

7. In a machine of the kind described, a stock feed consisting of spaced feed wheels, an intermittent driving gear for the wheels, a gear shift to determine the length of the feed, a lock for the feed wheels, and means for simultaneously adjusting the lock and the gear shift.

8. In a machine of the kind described, a stock feed consisting of spaced rotatable feed wheels, a plurality of mutilated gears to intermittently drive the wheels, said gears having different numbers of teeth to provide for the movement of the feed wheels, a lock for the feed wheels, a cam for each mutilated gear arranged to actuate the lock in co-ordination with the feed wheel drive, and a gear shift for selecting the driving gear, said shift automatically controlling the cam mechanism to actuate the lock in co-ordination with the drive of the feed wheel.

9. In a machine of the kind described, an intermittent stock feed having spaced rotary wheels to move a stock strip lengthwise through the machine, a presser foot behind the last feed wheels movable back and forth with relation to the stock and adapted to hold it flat, and a transverse rotary cut-off movable across the stock adjacent to the presser foot and shaped to skive the stock ends near the line of severance.

10. In a machine of the kind described, an intermittent stock feed having spaced pairs of wheels to engage and move the stock, a bed behind the last pair of feed wheels, a presser foot having spaced portions movable back and forth with relation to the stock and acting to engage the latter at opposite sides of the bed, hold said stock flat and smooth on the bed while the stock feed rests, and a rotary cut-off device moving across the stock between the presser foot portions.

11. In a machine of the kind described, an intermittent stock feed having spaced pairs of feed wheels, a bed behind the last pair of feed wheels, a presser foot movable back and forth with relation to the stock and arranged to hold the stock flat on the bed while the feed rests, means for locking the feed wheels at the end of each movement, and a cut-off device moving across the stock near the presser foot and acting to skive the adjacent parts of the severed stock.

12. In a machine of the kind described, an intermittently acting stock feed having spaced pairs of rotary wheels to feed a stock strip lengthwise, a presser foot behind the last pair of feed wheels movable back and forth with relation to the stock, a slide movable transversely of the travel of the stock and arranged to actuate the presser foot, and a cut-off knife carried by the slide.

13. In a machine of the kind described, an intermittent stock feed to feed a stock strip lengthwise, a slide movable transversely of the stock, a presser foot movable up and down with relation to the stock and arranged to hold the stock flat, and a cut-off knife carried by the slide and shaped to sever the stock and skive the parts of the stock near the line of severance.

14. In a machine of the kind described, an intermittent stock feed for feeding a stock strip lengthwise, a presser foot movable up and down with relation to the stock and shaped to hold the stock flat, a slide movable transversely of the stock feed and arranged to actuate the presser foot, and a buzz cutter carried by the slide and shaped to sever the stock and skive the adjacent parts.

15. In a machine of the kind described, an intermittent stock feed for feeding a stock strip lengthwise, a presser foot movable up and down with relation to the stock and having a transverse opening therethrough, and a cutter movable transversely of the stock and in the aforesaid opening to sever and skive the stock.

16. In a machine of the kind described, an intermittent stock feed to feed a stock strip lengthwise, a presser foot movable up and down with relation to the stock, a slide moving transversely of the stock, a buzz cutter carried by the slide and movable adjacent to the presser foot, said cutter being shaped to sever and skive the stock, an extension on the under part of the slide, and means for operating the presser foot by the movement of the said extension.

17. In a machine of the kind described, the combination of the stock feed, the bed, the presser foot enclosing the feed and movable up and down with relation thereto, parts of the presser foot extending to a point behind the stock, a slide movable transversely of the stock and adjacent to the presser foot, a cut-off knife carried by the slide, and a member carried by the slide and operatively connected with the under parts of the presser foot to acuate the said presser foot.

18. In a machine of the kind described, the combination of a stock support, a stock feed moving the stock over the support, a presser foot movable up and down with relation to the stock and having members extending through the stock support, a slide movable transversely of the stock adjacent the presser foot, rollers carried by the presser foot behind the stock support, and an extension on the slide engaging the said rollers to press the presser foot upon the stock.

19. In a machine of the kind described, a stock support, a stock feed to move a stock strip lengthwise over the support, a spring pressed presser foot movable up and down with relation to the stock, a slide traversing the stock near the presser foot and having a cut-off knife to engage the stock, and means actuated by the slide for moving the presser foot against the tension of its springs.

In testimony whereof, I have signed my name to this specification this 1st day of July 1924.

THOMAS A. BEANEY.